June 2, 1959 J. R. CRABB 2,889,131
FEEDING AND WEIGHING SYSTEM FOR PRODUCE OR
OTHER HETEROGENEOUS COMMODITIES
Filed June 5, 1956 7 Sheets-Sheet 1

INVENTOR.
JASPER R. CRABB
BY ATTYS.
BY

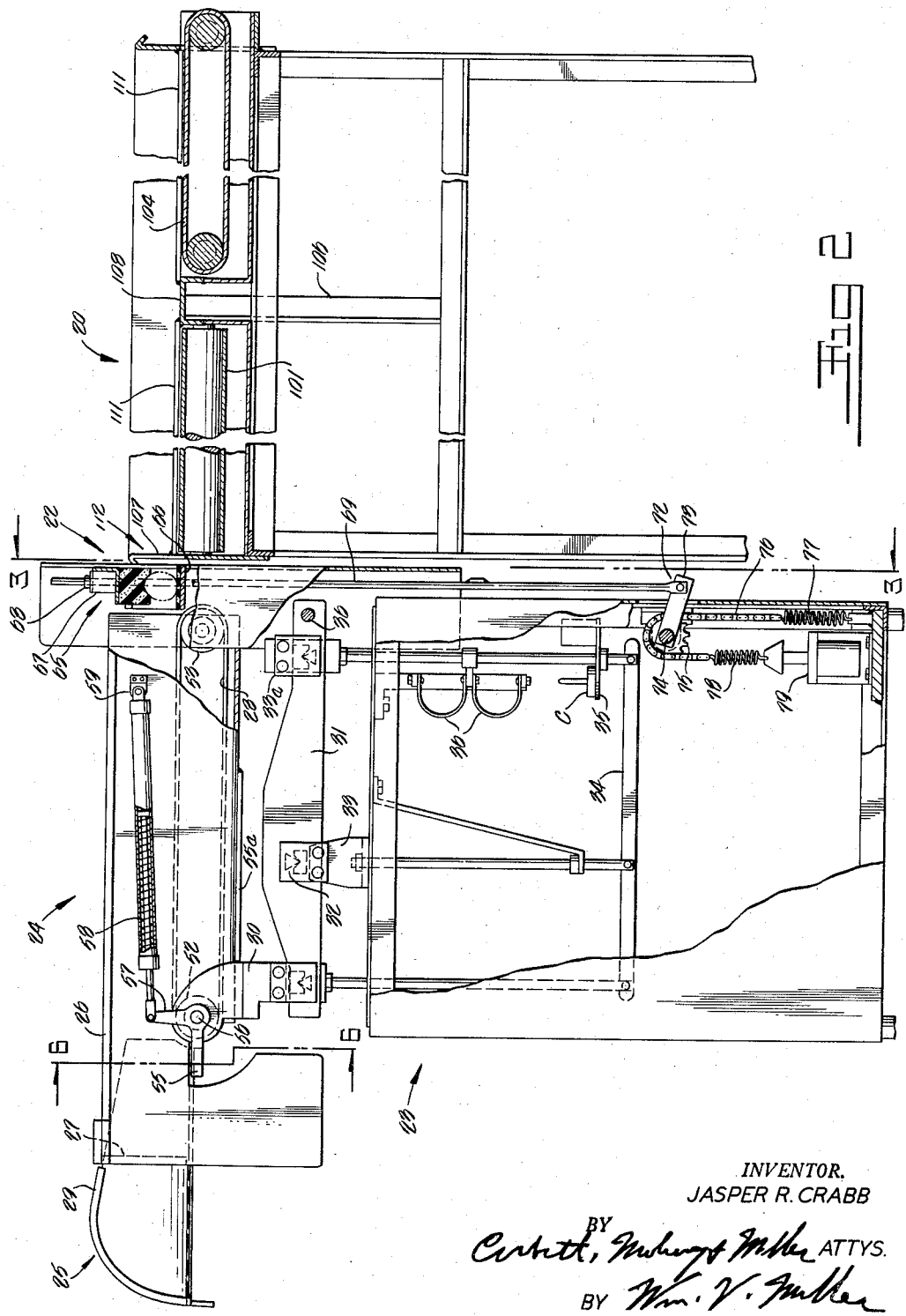

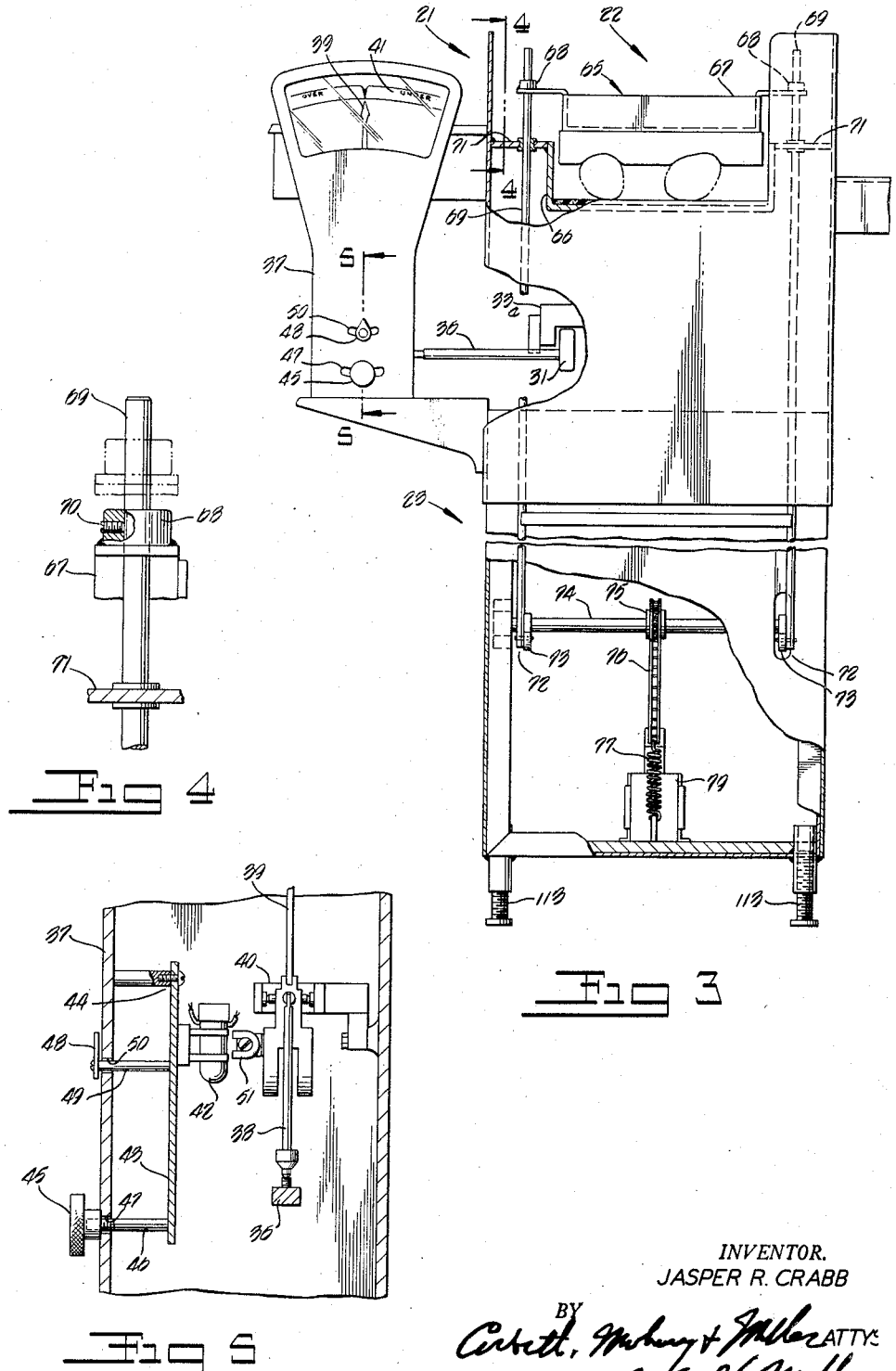

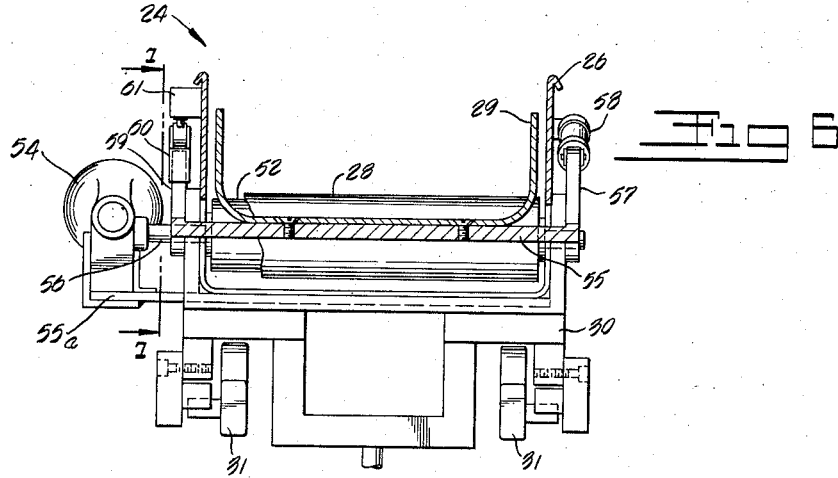
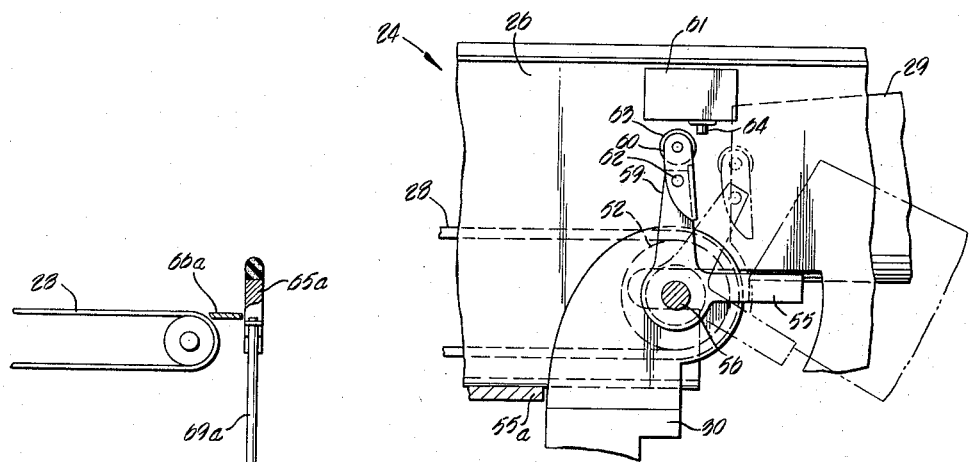
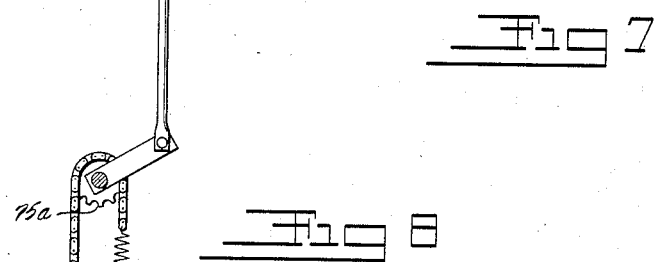
INVENTOR.
JASPER R. CRABB

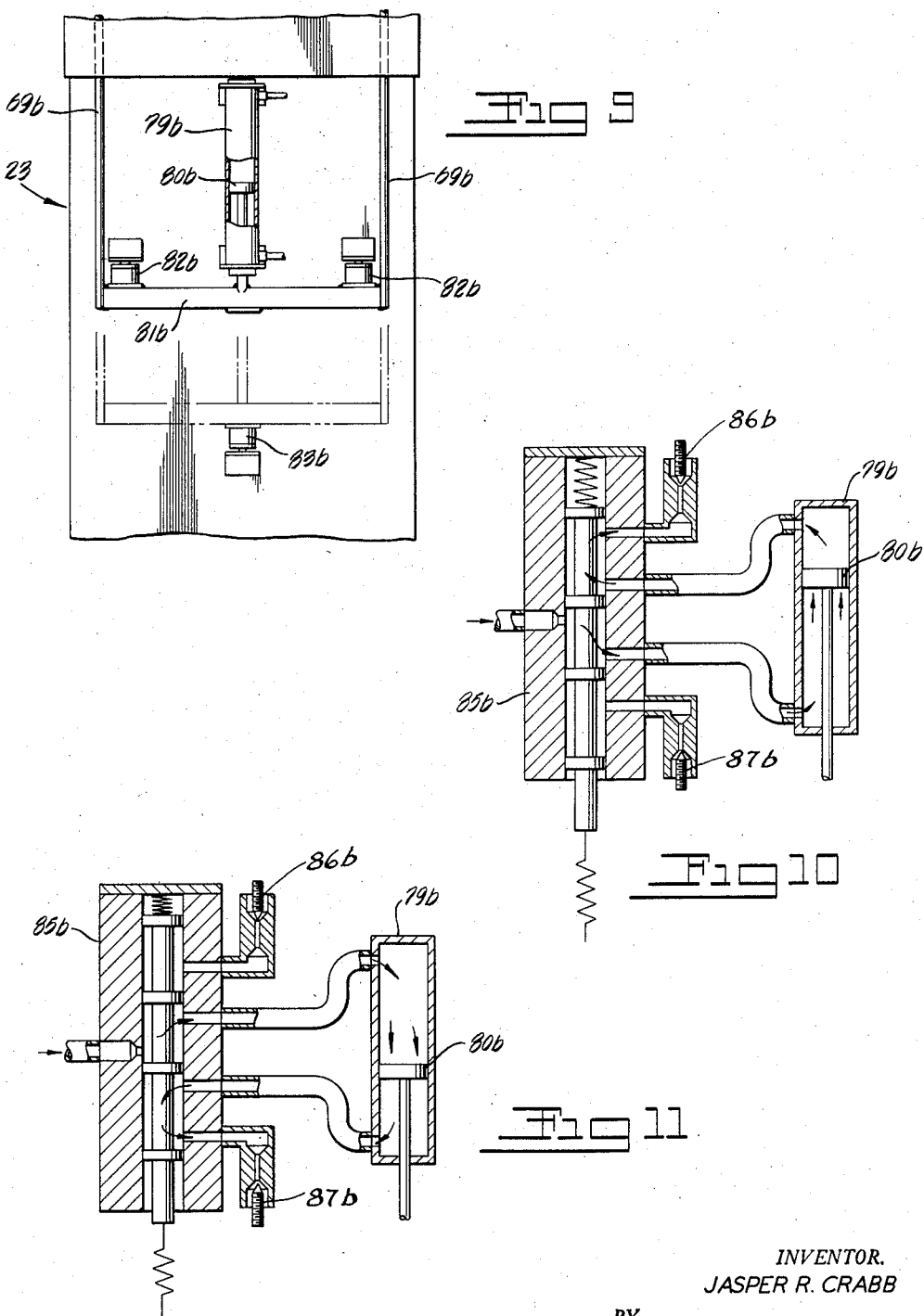

June 2, 1959  J. R. CRABB  2,889,131
FEEDING AND WEIGHING SYSTEM FOR PRODUCE OR
OTHER HETEROGENEOUS COMMODITIES
Filed June 5, 1956  7 Sheets-Sheet 6
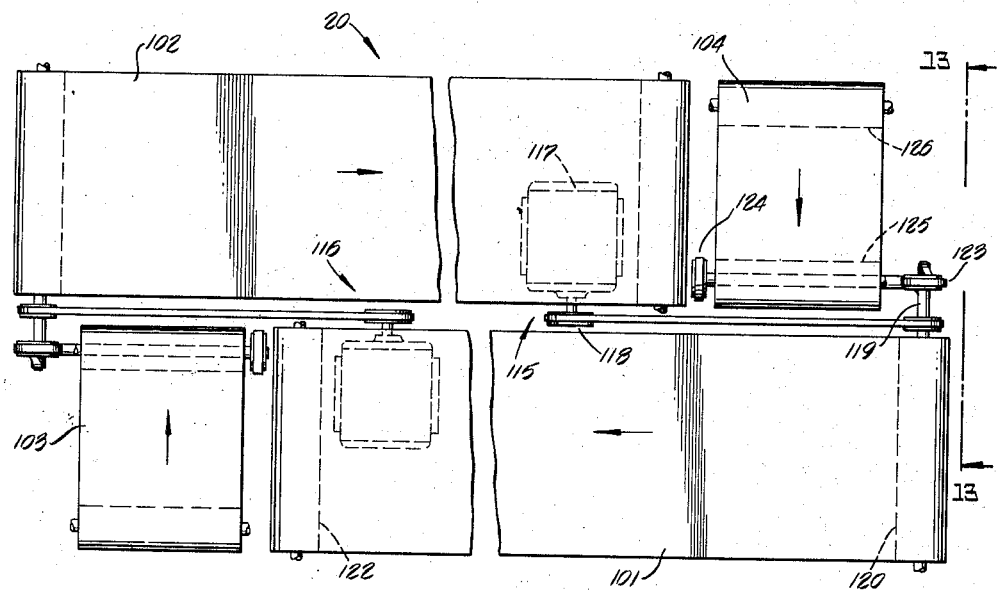
Fig 12
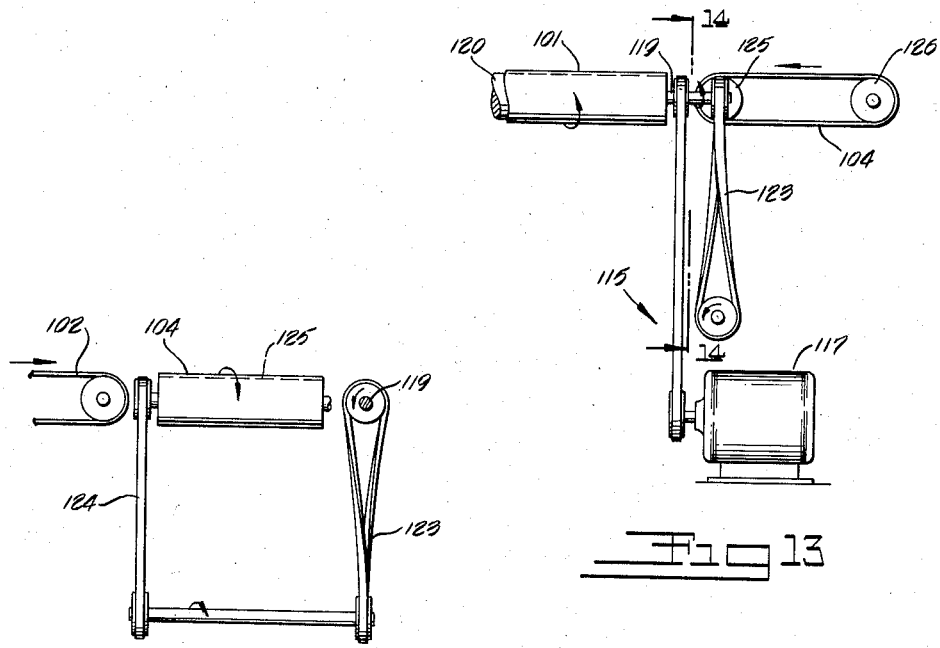
Fig 13
Fig 14
INVENTOR.
JASPER R. CRABB
BY
ATTYS.
BY

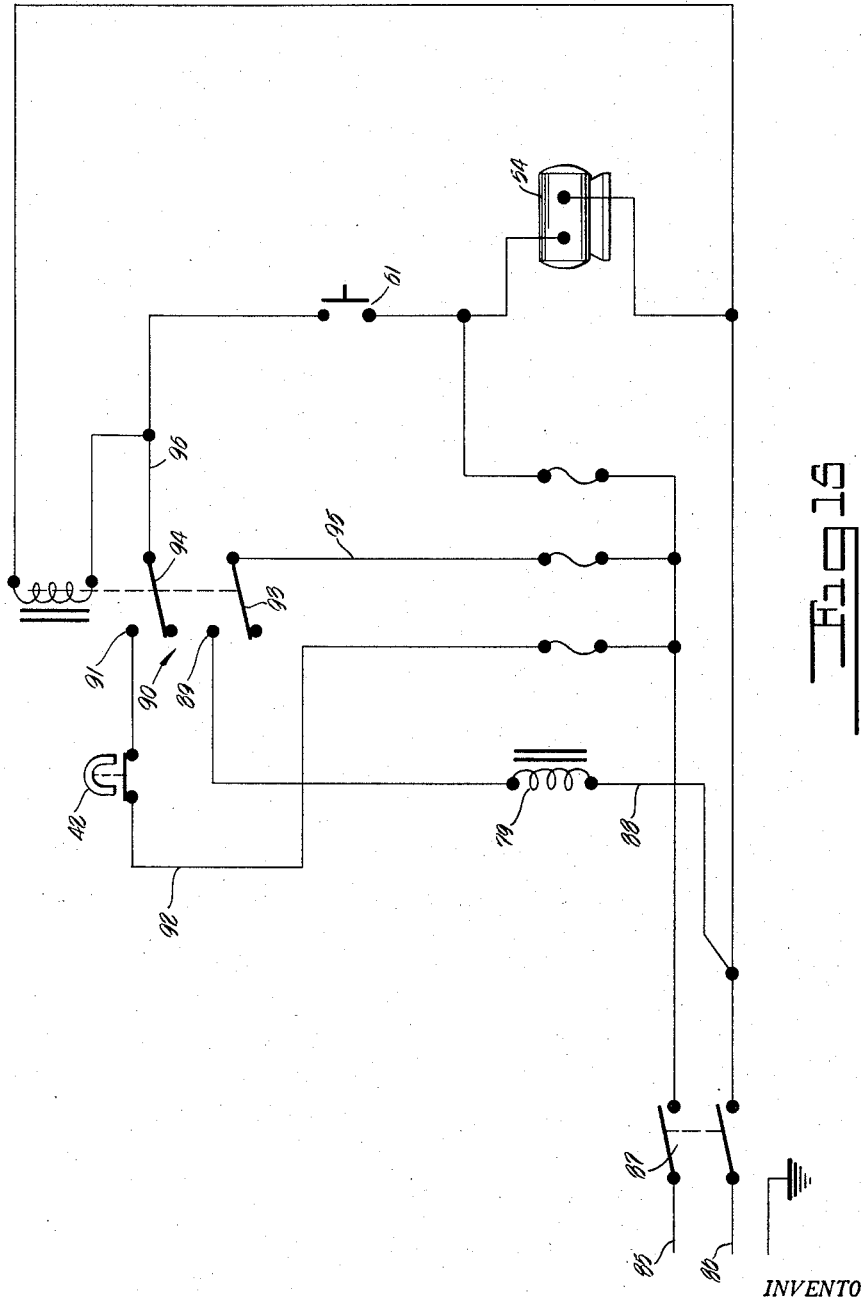

United States Patent Office 2,889,131
Patented June 2, 1959

2,889,131

FEEDING AND WEIGHING SYSTEM FOR PRODUCE OR OTHER HETEROGENEOUS COMMODITIES

Jasper R. Crabb, Yakima, Wash., assignor to National Industrial Products Company, a corporation of Ohio Application June 5, 1956, Serial No. 589,402

4 Claims. (Cl. 249—17)

My invention relates to a feeding and weighing system for produce or other heterogeneous commodities. It has to do, more particularly, with a feeding system for receiving produce and feeding it in proper volume into association with each of a plurality of weighing and bagging machines which will automatically and successively weigh the produce in preselected amounts or charges and feed each charge after weighing into a bag or other container.

In my copending application Serial Number 515,051, filed June 13, 1955, I have disclosed a weighing and bagging machine which is especially suitable for weighing and bagging produce. My present invention provides for a conveyor arrangement for feeding each of a plurality of such weighing and bagging machines with a proper volume of produce. My present invention also provides for a novel gate structure in association with each weighing and bagging machine, between it and the conveyor, which is controlled by the weighing operation of that particular weighing and bagging machine to automatically control the feed of produce from the conveyor to the weighing and bagging machine.

In the accompanying drawings, I have illustrated a preferred arrangement of the feeding system in conjunction with a plurality of weighing and bagging machines and several variations of control gates used for controlling the feed of articles to the weighing and bagging machines. In these drawings:

Figure 2 is a vertical sectional view taken along line 2—2 of Figure 1 illustrating details of the feed conveyor, the weighing and bagging machine, and one type of feed control gate.

Figure 3 is a view, partly broken away, of one of the weighing and bagging machines, taken at the end where the control gate is disposed, along line 3—3 of Figure 2, the control gate being a drop gate.

Figure 4 is a detail view in vertical section taken along line 4—4 of Figure 3, showing one of the gate control rods.

Figure 5 is a vertical sectional view taken along line 5—5 of Figure 3, showing the switch arrangement which is actuated by the weighing and bagging machine indicator for controlling the feed control gate.

Figure 6 is a vertical sectional view taken transversely through the delivery gate of the weighing and bagging machine along line 6—6 of Figure 5.

Figure 7 is a vertical sectional view taken substantially along line 7—7 of Figure 6 showing the switch arrangement actuated by the delivery gate and which, in combination with the indicator-actuated switch, controls the feed control gate.

Figure 8 shows a pop-up feed control gate arrangement which can be used in the system instead of the drop gate of Figure 3, this gate being controlled by a solenoid.

Figure 9 shows an air cylinder arrangement instead of a solenoid for controlling the feed gate.

Figure 10 is a schematic view of the air system of Figure 9 for controlling the gate, the valve thereof being shown in position to move the piston in the air cylinder to up position.

Figure 11 is a view similar to Figure 10 but with the valve in position to move the piston to down position.

Figure 12 is a schematic view in plan illustrating the drive for the feed conveyor arrangement.

Figure 13 is a schematic end view of the conveyor drive taken along line 13—13 of Figure 12.

Figure 14 is a view of the drive taken along line 14—14 of Figure 13.

Figure 15 is a diagrammatic view showing the electric circuit for each of the weighing and bagging machines.

Figure 1:
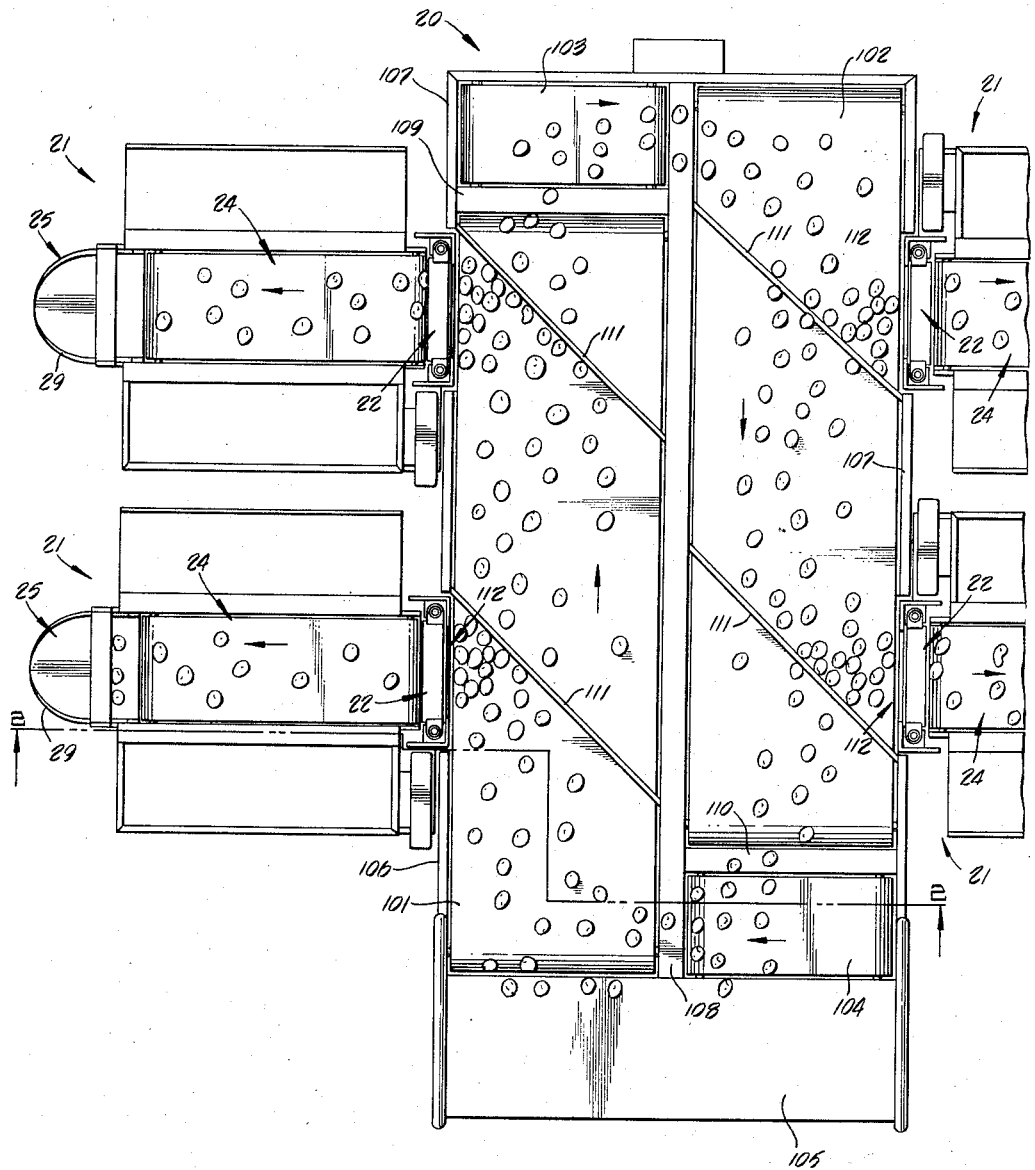
Figure 1 is a plan view of a conveyor arrangement and associated weighing and bagging machines in accordance with my invention.

With reference to the drawings, in Figure 1 I have illustrated the general arrangement of my feeding and weighing system. This system comprises a feed conveyor unit 20 which is of substantially rectangular form in plan. By having this conveyor unit 20 of rectangular form, it is possible to provide weighing and bagging machines 21 at spaced positions along each of the longitudinal edges thereof. As will later appear, the feed conveyor unit 20 is adapted to receive the produce or other material to be weighed and to feed it in the proper volume to each of the weighing and bagging machines 21 which are associated therewith. Each of the weighing and bagging machines 21 will automatically and successively weigh the produce supplied thereto in preselected amounts or charges and will feed each charge after weighing, under the control of an operator, into a bag or other container properly held by the operator in association with the weighing and bagging machine. Furthermore, each weighing and bagging machine 21 will control automatically a gate unit 22, disposed between the conveyor unit and the weighing and bagging machine, and which will, in turn, control the feed of produce from the conveyor unit to the weighing and bagging machine. The weighing and bagging machine 21 is of a structure substantially like that disclosed in my copending application Serial Number 515,051 and will function in substantially the same manner described therein. These weighing and bagging machines may be used in any suitable number depending upon the length and arrangement of the feed conveyor unit 20.

Each of the weighing and bagging machines 21 is illustrated best in Figures 2 to 7, inclusive. It comprises a suitable frame 23 which supports a weighing unit 24, the feed control gate unit 22 which is disposed at the inlet end of the unit 24, and the delivery unit 25 which is disposed at the delivery end of the unit 24.

The weighing unit 24 (Figure 2) includes the weighing compartment 26. This weighing compartment 26 is mounted for vertical movement at the upper side of the frame 23. The compartment 26 at its inlet end receives the produce fed thereto when the gate of the gate unit 22 is open. The opposite end of the compartment 26 is closed by a stationary baffle or wall 27 which is a part thereof. The top of the compartment 26 is open and the bottom is formed by a weighing belt 28 and a pivoted scoop gate 29 which cooperate with the baffle 27. The scoop gate 29 is pivoted to the side walls of the compartment 26 for vertical swinging movement and will be described more in detail later.

The weighing belt 28 is carried on the commodity outrider 30 of a weighing scale of a suitable type and which includes a beam or lever 31 which is fulcrumed at 32, intermediate its length, on a bearing structure 33 that is carried by the frame 23. The lever 31 pivotally carries the commodity outrider 30 at one side of the fulcrum 32 and pivotally carries the counterweight outrider 33 at the other side. A check-rod structure 34 connects the two outriders in the usual way. The counterweight outrider 33 carries the weight platform 35 for receiving suitable counterweights and has connected to it the flexes 36 in the form of opposed U-shape springs which are anchored to the frame 23 and resist movement of the lever 31 in either direction away from balanced position.

As shown in Figure 3, the lever 31 is provided with a rigid arm 36 extending laterally therefrom and the outer end of which extends into an indicator tower 37 which is disposed on a support provided at the left-hand side (Figure 3) of the frame 23. This arm 36 (Figure 5) is connected by means of a gravity-type push-rod 38 to the indicator pointer 39 which is of the pendulum type and is pivotally mounted in the tower at 40. The upper end of this pointer 39 cooperates with a dial 41 of the over-and-under weight type which is mounted in the upper end of the tower 37.

Associated with the lower end of the indicator pointer 39 in the tower 37, as shown in Figure 5, is a mercury switch 42. This mercury switch, as will later appear, is adapted to control the operating mechanism for the gate unit 22 of that particular weighing and bagging machine. The switch 42 is fastened to the side of the tower 66 by means of an adjustable bracket 43. This bracket is pivoted to the tower at 44 and is adjustable from the exterior of the tower by means of a clamping knob 45 (Figures 3 and 5) on a screw 46 which may be shifted in a slot 47. The switch may be set in a fixed position by tightening the knob 45. A pointer 48 is disposed outside the tower and cooperates with associated indicia. The pointer 48 is carried on the outer end of a pin 49 which is also carried by the bracket 43 and extends out through an arcuate slot 50 in the tower. The lower end of the indicator pointer 39 carries an electromagnet 51 which swings in a vertical plane closely adjacent the switch 42 in accordance with the swinging of the indicator pointer 39. The magnet 51 is so located that when the scale lever 31 and the pointer 39 move to correct-weight position, the switch 42 opens. However, the bracket 43 can be adjusted to vary the position of the switch 42 relative to the indicator pointer 39, and, therefore, vary the instant when the switch 42 opens. This switch 42 is included in a circuit which will be described in detail later.

As indicated in Figure 2, the weighing belt 28 is carried by the rollers 52 and 53 which are rotatably mounted at the opposite ends of the weighing compartment 26 in the side walls thereof. The roller 53 is an idler roller whereas the roller 52 is positively driven by means of an electric motor 54 as shown in Figure 6. This motor 54 is carried on a lateral extension of the platform 55a which is carried on the outrider 30, and is free to move vertically therewith. Thus, the weighing belt 28 and the driving means therefor, motor 54, are carried by the outrider element 30, along with the weighing compartment 26 for vertical movement with the commodity end of the weighing lever 31. The motor 54 drives the weighing belt 28 continuously and is connected in the electric circuit of the machine in a manner to be described later.

The discharge unit 25, as previously indicated, includes the scoop gate 29 which is disposed at the outlet end of the weighing compartment 26 and is carried on the weighing compartment for movement therewith. This gate 29, in its closed position, is just below the level of the weighing belt 28 (Figure 2) and, along with the weighing belt, forms the bottom of the compartment 26. Thus, the bottom of the compartment is formed throughout the greater portion of its length by a continuously moving belt and the remainder of its length, at the discharge end, is formed by the stationary surface of the gate 29. The gate 29 is scoop-shaped and, when in its upper position, closely embraces the associated semi-circular lower edge of the baffle 27 which, as previously described, is at the discharge end of the weighing compartment, as shown best in Figure 2. The extreme outer end of the scoop gate 29 is pointed, as indicated in Figure 1, so that it can cooperate with various size bags to direct the material from the weighing compartment 26 into the opened end of each bag. The scoop gate 29 is carried by a transverse bracket 55 (Figures 2, 6 and 7) pivoted on the same shaft 56 that carries the weigh belt roller 52. This bracket 55 carries at one side (Figures 2 and 6) an upstanding actuating rockable arm 57 to which a tension spring 58 is attached, this spring being anchored at its opposite end, as indicated at 59 to the corresponding side of the weighing compartment 26. The spring 58 acting on the rockable arm 57 tends to swing the scoop gate 29 upwardly into contact with the baffle 27 to normally hold it in this closed position.

At its opposite side, the bracket 55 is provided with an upstanding arm 59 (Figure 7) which carries a switch-actuating trigger 60 which is adapted to actuate a switch 61 that also controls the feed control gate unit 22 and is connected in the circuit of the machine with the switch 42 as will be described later. The trigger 60 is of the pendulum type pivoted at 62 to the arm 57 so that gravity normally tends to keep it upright. It carries on its upper end a roller 63 which is adapted to engage the push button 64 of the switch 61. The switch 61 is carried on the corresponding side of the weighing compartment 26 adjacent its upper edge as shown best in Figure 7.

As previously indicated, each of the weighing and bagging machines 21 is provided with a feed control gate unit 22 which is located at the inlet end of the weighing compartment 26. In Figures 2 and 3, I have illustrated this gate as being a drop gate 65. This gate is disposed for vertical movement above a horizontal U-shaped plate 66 which is at the same level as the continuously moving weigh belt 28 and which is suitably supported by the frame 23. The plate 66 is provided with a covering of compressible material and the gate 65 is in the form of a block of compressible material, such as sponge rubber, as illustrated best in Figure 2. The gate is carried by a bracket 67 which is provided with laterally extending ends that carry collars 68. Guide rods 69 pass upwardly through these collars and each collar 68 is provided with a set screw 70 (Figure 4) which permits the cooperating guide rod to be adjusted axially thereof and to be held in fixed position. The guide rods 69 are vertically slidable in bushings provided in extensions 71 of the plate 66. The lower end of each rod 69 is pivoted at 72 to a rocker arm 73 (Figure 2). These rocker arms are keyed on the opposed ends of a transverse shaft 74 (Figure 3) which is rotatably carried by the frame 23 adjacent the lower end thereof. The shaft 74 is provided with a sprocket 75 which is keyed thereon intermediate the ends thereof. A sprocket chain 76 passes around this sprocket. One end of this chain is anchored by means of a tension spring 77 to a part of the frame 23. The other end is connected by means of a tension spring 78 to the core of an electric solenoid 79.

It will be apparent later that the solenoid 79 is connected in an electric circuit with the switch 42 which is controlled by the indicator pointer 39 and with the switch 61 which is controlled by the scoop gate 29, both of these switches controlling energization of the solenoid. Normally, the solenoid 79 is energized and overcomes the force of the spring 77 to cause the shaft 74 to rotate to such a position that the rocker arms 73 are swung upwardly and, consequently, push the rods 69 upwardly so that the gate 65 is moved upwardly into opened position. Whenever the solenoid 79 is deenergized, a reverse action takes place and the gate 65 is lowered by the action of the spring 77, to prevent passage of produce into the weighing compartment 26. Because the gate 65 is made of compressible material, it can engage any produce which might be on the plate 66, as shown in Figure 3, without causing injury thereto. For example, this gate will function to control the feed of apples, which can be easily bruised, without damage thereto. Because of the provision of the collars 68 and set screws 70, the guide rods 69 can be adjusted relative to the gate to provide for accurate positioning of the gate 65 relative to the plate 66.

Instead of using the drop gate 65, it is possible with certain types of produce to use a pop-up gate. Thus, in Figure 8, I have shown a pop-up gate 65a which is in the form of a plate having a compressible covering on its upper edge. This gate is mounted for vertical movement with the guide rods 69a similar to the mounting of the drop gate 65. Between this gate 65a and the weight belt 28 is a horizontal plate 66a. The actuating structure for the gate 65a is the same as that for the gate 65 except that the solenoid 79a is on the opposite side of the sprocket 75a. The gate 65a is in its lowermost position when solenoid 79a is energized and will permit the feed of produce to the weigh belt 28. However, when the solenoid is deenergized, the gate 65a will be pulled upwardly, by the spring 77a, above the plate 66a to interrupt passage of the produce to the belt 28.

An air cylinder arrangement may be provided instead of a solenoid for actuating either the drop gate of Figure 3 or the pop-up gate of Figure 8. In Figure 9, I illustrate an air cylinder arrangement for actuating the pop-up gate but it will be understood that the cylinder will merely be reversed for the drop gate. As shown in Figure 9, instead of the solenoid 79a, an air cylinder 79b is provided for actuating the pop-up gate. The cylinder 79b is fixed to the frame of the weighing and bagging machine and the piston 80b thereof is connected to a cross arm 81b, which, in turn, is connected to the guide rods 69b for operating the gate. The cross arm 81b operates between a pair of upper bumpers 82b and a lower bumper 83b which determine its upper and lower positions and, therefore, stop the gate at its upper and lower positions, respectively. As shown in Figures 10 and 11, the air cylinder 79b is controlled by an electromagnetic valve 85b. The valve 85b is of the spool type and is shown in Figure 10 in energized condition to permit air to enter the upper end of the cylinder 79b and exhaust from its lower end so as to move piston 80b downwardly and, therefore, move the gate downwardly to permit feed of produce to the belt 28. When the valve 85b is deenergized, as shown in Figure 11, the air is supplied to the lower end of the cylinder 79b and exhausted from the upper end so that the piston 80b will move upwardly and will move the gate into its upper position to interrupt feed of produce to the belt 28. The exhaust of air during upward movement of the piston 80b is controlled by an adjustable needle 86b and during downward movement by an adjustable needle 87b. Thus the speed of movement of the piston 80b and, consequently, the gate in either direction can be controlled.

The electric circuit for each of the weighing and bagging machines is illustrated diagrammatically in Figure 15. The main power lines 85 and 86 are controlled by the main switch 87. Connected to one side of the circuit, that is, to the line 86, is a line 88 in which the coil of the feed control gate solenoid 79, or the equivalent electromagnetic valve, is connected. The end of this line 88 is provided with a contact point 89 which is part of an actuating relay 90. Another fixed contact 91 of this relay 90 is connected by a line 92 to the opposite side of the circuit, that is, to the line 85. The mercury switch 42 is connected in this line 92 and is normally closed. The relay 90 also includes the ganged movable contact arms 93 and 94. The arm 93 is connected by a line 95 to the power line 85. The other arm 94 is connected by a line 96 to the other power line 86. The coil of the relay 90 is connected in the power line 86 which also connects to the line 96. In the line 96, the switch 61 is also connected and is normally open. The motor 54 which drives the weigh belt 28 is connected to the lines 85 and 86 and this motor is continuously energized.

The operation of each weighing and bagging machine will now be described. The operator will stand in front of the machine adjacent the scoop gate 29. If the main switch 87 of the machine is turned off and there is no counterweight on the platform 35, the weighing lever 31 will be in balanced position, the indicator pointer 39 will be in exact weight position on the dial 41, the feed control gate 65, or its equivalent gate, will be closed, the weight belt 28 will be stopped, and the discharge scoop gate 29 will be in its upper closed position. If the operator now turns the switch 87 on and places a counterweight C on the platform 35, the machine will be in underweight condition because the counterweight will be selected to balance the charge of produce which it is desired to bag. Thus, the counterweight C will cause the lever 31 to move to underweight position, moving the pointer 39 to the underweight side of the dial 41. This will close the mercury switch 42. However, this will not yet complete the circuit to the feed gate control solenoid 79 and the gate 65 will not be opened since the switch 61 will be open. The weigh belt 28 will be continuously driven and the scoop gate 29 will be in its upper closed position. To start the feeding cycle, the operator will depress the scoop 29 as indicated by the dotted lines in Figure 7 and then the scoop will be permitted to return to its upper position as shown by the full lines. As the scoop 29 comes back to its upper position the roller 63, carried by the trigger 60, engages the push button of the switch 61, closing it momentarily, but moves past the button as the scoop reaches horizontal position, so that the switch will again open. However, during the instant the switch 61 is closed, the circuit to the relay 90 is completed, thereby energizing the relay and causing it to complete the circuit to the coil of the solenoid 79, it being remembered that the mercury switch 42 is still closed at this time since the scale lever is still in the underweight position. Therefore, the drop gate 65 will be opened, due to energization of the clutch solenoid 46, and will permit feed of the produce into the weighing compartment 26 and onto the traveling weigh belt 28. This produce will be carried to the end of the weighing compartment onto the scoop gate 29 and, if the predetermined charge is sufficiently large, will accumulate on the belt 28, the belt merely sliding beneath the produce. Due to the fact that the scoop gate 29 forms the outer portion of the bottom of the weighing compartment 26, and is a dead surface, the produce will not pile up against the baffle 27 but will arrange itself in a shallow layer on the gate and back on the belt 28 if the charge is sufficiently large. This accumulation of produce in the weighing compartment 26 will gradually move the pointer 39 towards correct-weight position. When the pointer does reach correct-weight position, as shown in Figure 3, the mercury switch 42 will be actuated by the pointer to deenergize the coil of the feed control gate solenoid 79, close the gate 65, and thereby stop the feed of produce onto the weigh conveyor 28. At this time, the weighing compartment 26 will have a predetermined charge of produce accumulated therein. The adjustment of the switch 42 by means of the knob 45 can be used so that the feed control gate will close just shortly before the correct-weight position of the indicator is reached. This may be termed "prediction" and is varied for different produce. For example, for nonuniform large articles, such as potatoes, the prediction should be comparatively great whereas for more uniform smaller articles, such as peas, the prediction can be substantially less. When the charge is correctly weighed, it is merely necessary for the operator to position a bag over the outer end of the scoop gate 29 and swing the scoop downwardly to direct the charge into the bag. Thus, the weighing operation is automatic but the discharge of material from the weighing compartment 26 is controlled by the operator and this control is facilitated by the fact that the scoop gate 29 is a dead surface rather than a moving one. The cycle can again be started merely by returning the scoop gate 29 to its upper position which will momentarily energize the switch 61.

The feed conveyor unit 20 is illustrated best in Figures 2, 12, 13 and 14. As previously indicated, it is substantially rectangular in plan so that a plurality of the weighing and bagging units 21 may be disposed at longitudinally spaced intervals along each of the elongated edges thereof as illustrated best in Figure 1. I have shown two of the weighing and bagging units at each side of the conveyor unit but it is to be understood that a provision may be made for a greater number of the weighing and bagging units by increasing the length of the conveyor unit 20.

The conveyor unit comprises two elongated belts 101 and 102 extending longitudinally in parallel relationship, being of equal length but having their ends offset in the direction of their lengths. In the offsets provided at the opposite ends of the conveyor unit by this arrangement of the long belts 101 and 102, the cross-feed belts 103 and 104 are provided. The long belts 101 and 102 feed in opposite directions and the cross-feed belts 103 and 104 feed in oposite directions. The cross-feed belts 103 and 104 are of a length corresponding substantially to the width of the belts 101 and 102. At one end of the conveyor unit 20 is a feed hopper 105 which receives the produce, the bottom thereof being inclined towards the belts 101 and 104 to feed the produce thereto. The various belts are driven in such a manner that the produce received by the long belt 101 will be fed along the conveyor unit to the cross-feed belt 103, which will feed it to the long belt 102, which carries it back to the opposite end to the cross-feed belt 104, which will take it back to the long belt 101. Thus, the produce may travel a complete circuit but during this circuit travel some of it, as will later appear, will be fed to each of the weighing and bagging machines 21.

The belts 101, 102, 103 and 104 are carried at the upper side of a frame 106 of suitable construction. The frame carries an upstanding peripheral wall 107 (Figure 2) which extends completely therearound adjacent the outer edges of each of the belts and serves to prevent the produce from rolling off the outer edges of the belts. Extending longitudinally between the belts at each side of the conveyor unit and midway between the sides of the peripheral wall 107 is a divider beam 108 of inverted channel form which has its upper surface substantially flush with the upper surfaces of the various belts. Similar transverse beams 109 and 110 are provided between belts 101 and 103 and belts 102 and 104, respectively. As the produce transfers from one belt to another, it will pass over the flat surfaces of these beams. The hopper 105 is formed at one end between the sides of the peripheral wall 107.

To direct the produce from each long belt to an adjacent weighing and bagging unit 21, the long belts 101 and 102 are provided with the produce directing lips 111. One of these lips is provided for each associated weighing and bagging unit 21 and is in the form of a small diameter rod extending diagonally thereof. The inner end of each rod is welded to the beam 108 and its outer end is welded to the peripheral wall 107. The associated belt will merely slide below the rod. At each position along the sides of the conveyor unit 20 where each of the weighing and bagging units 21 is to be disposed, the peripheral wall 107 is cut away to provide an exit passage 112 for the produce. Each associated produce directing lip has its outer end just beyond this exit passage 112 in the direction of travel of the associated belt. Thus, produce will be directed through these passages 112, by the associated lips 111, to the associated weighing and bagging units 21. The gates 22 of the units 21 will be in alignment with the exit passages 112 of the conveyor unit 20. The units 21 are preferably vertically adjustable so that the level of the gate plates 66 thereof can be adjusted to the exact level of the associated conveyor belt 101 or 102, as shown in Figure 2. The adjustment for this purpose, as shown in Figure 3, may be in the form of adjusting screws 113 at the lower ends of the supporting legs of the frame 23.

The drive arrangement for the conveyor belts is illustrated best in Figures 12, 13 and 14. This drive is separated into two units, that is, one unit 115 for the long belt 101 and the associated cross belt 104 and the other unit 116 for the long belt 102 and the cross belt 103. Since these units are identical, only one of them will be described in detail. Thus, in Figures 12, 13 and 14, the drive unit 115 is shown as comprising an electric drive motor 117 which through a chain and sprocket drive 118 drives the shaft 119 which supports the belt driving roll 120 that drives the endless belt 101. The opposite end of the belt is supported by an idler roll 122. These rolls are suitably supported in bearings on the frame 106. The shaft 119 drives a twist belt drive 123 which, in turn, drives a belt drive 124 that drives a belt driving roll 125 at right angles to the roll 120. This roll 125 supports the endless cross belt 104 at one end and drives it, the opposite end being supported by the roll 126. Thus, the belts 101 and 104 are driven continuously by the drive unit 115 and the cross belt 104 is preferably driven at a greater linear speed than the long belt 101. The other belts 102 and 103 are driven continuously in the same manner by the drive unit 116.

In the operation of this system, the produce will be supplied at the hopper 105. Part of it will be carried by the cross-feed belt 104 onto the end of the long belt 101 and part of it will roll directly thereon. It will be carried by the belt 101 into association with the successive weighing and bagging machines 21, some of it being directed to the gates 22 thereof by the lips 111 and the remainder rolling on over these lips. As the produce reaches the end of the conveyor unit, it will not pile up, since it will roll onto the cross-feed belt 103 and will be quickly conveyed onto the long belt 102. Piling up at this end of the conveyor unit will be prevented by the cross-feed belt 103. This will also prevent injury to the produce which might result if a plow or baffle were used to direct the produce crosswise. The belt 102 will carry the produce successively into association with the weighing and bagging machines provided therealong, and then into association with the cross-feed belt 104 which will return the part that did not feed to the units 121 all around the conveyor unit to the belt 101 along with more from the hopper 105 and the cycle will be repeated. The gate units 22 of the respective weighing and bagging machines will open automatically whenever they need produce from the conveyor unit 20.

The weighing and bagging machines 21 will weigh successive batches of the produce, the weighing being accomplished on a live conveyor belt 28 in combination with the dead scoop gate 29. The scoop gate 29 need not be exceptionally large and overfilling at the rear of the scoop gate or bridging while charging into the bag is prevented. The scoop gate 29 acts as both a collecting and a directing means. The gate 29 and associated parts are carried by the vertically moving weighing compartment and do not interfere with the accuracy of the weighing operation. The production of the machine is under the control of the operator even though the weighing is automatic since the scoop gate 29 also controls the gate unit 22 in combination with the control by the movement of the indicator pointer 39.

Having thus described my invention, what I claim is:

1. A weighing machine comprising a weighing unit having a weighing compartment with an inlet end and an outlet end, a substantially horizontally disposed bottom for said compartment formed by a weigh belt and by a vertically swingable discharge gate, means for continuously driving the weigh belt, said belt extending from the inlet end of said compartment toward the outlet end but being spaced therefrom and the discharge gate extending the remainder of the distance to the outlet end which is closed by a transverse upstanding wall, yieldable means for normally holding said discharge gate in non-discharge position where it is a substantially horizontal continuation of said weigh belt but yielding for downward movement into discharge position to discharge the contents of said weigh compartment moved into association therewith by the weigh belt, a feed gate at the inlet end of said compartment for controlling feeding of material to be weighed into said compartment and onto said weigh belt, control means operated by the weighing unit to control said feed gate, and additional control means actuated by movement of the discharge gate to control said feed gate.

2. A weighing machine according to claim 1 in which the discharge gate is of scoop form having a wide receiving end mounted adjacent the weigh belt and a converging outlet end so it will direct the weighed material from the belt into a suitable receptacle.

3. A weighing machine according to claim 1 in which electrically-actuated means is provided for operating said feed gate, and said control means each comprises a switch connected in a circuit with said electrically-actuated means, said control switches comprising a switch actuated by the weighing unit as it approaches balance for partially completing the circuit and a switch actuated by said discharge gate upon movement into non-discharge position for completing the circuit.

4. A weighing machine according to claim 3 in which the gate is a drop gate supported for vertical movement relative to the plane of the weigh belt at the inlet end thereof, means for normally holding the gate in raised position to permit feed of articles onto said weigh belt, said electrically-actuated operated means for the feed gate serving to drop it into a lower closed position to interrupt flow of articles onto said weigh belt, said drop gate being formed of compressible material so as not to injure articles when it is dropped thereon.

References Cited in the file of this patent

UNITED STATES PATENTS

| | | |
|---|---|---|
| 719,446 | Dyer | Feb. 3, 1903 |
| 756,551 | Abraham | Apr. 5, 1904 |
| 856,993 | Teague | June 11, 1907 |
| 930,138 | Boninie | Aug. 3, 1909 |
| 1,013,136 | Deats | Jan. 2, 1912 |
| 1,837,685 | Smith | Dec. 22, 1931 |
| 2,031,946 | Goodell et al. | Feb. 25, 1936 |
| 2,226,236 | Bleam | Dec. 24, 1940 |
| 2,336,326 | Weckerley | Dec. 7, 1943 |
| 2,340,030 | Weyandt | Jan. 25, 1944 |
| 2,398,643 | Jerome | Apr. 16, 1946 |
| 2,614,786 | Caron et al. | Oct. 21, 1952 |
| 2,614,787 | Grant | Oct. 21, 1952 |